(12) United States Patent
Giurgiutiu et al.

(10) Patent No.: US 9,158,054 B2
(45) Date of Patent: Oct. 13, 2015

(54) ACOUSTO-ULTRASONIC SENSOR

(71) Applicant: University of South Carolina, Columbia, SC (US)

(72) Inventors: Victor Giurgiutiu, Columbia, SC (US); Matthieu Gresil, Columbia, SC (US); Roman Catalin, Columbia, SC (US)

(73) Assignee: University of South Carolina, Columbia, SC (US)

( * ) Notice: Subject to any disclaimer, the term of this patent is extended or adjusted under 35 U.S.C. 154(b) by 340 days.

(21) Appl. No.: 13/667,710

(22) Filed: Nov. 2, 2012

(65) Prior Publication Data

US 2013/0129275 A1 May 23, 2013

Related U.S. Application Data

(60) Provisional application No. 61/554,716, filed on Nov. 2, 2011.

(51) Int. Cl.
| | |
|---|---|
| *G02B 6/00* | (2006.01) |
| *G01M 5/00* | (2006.01) |
| *G01D 5/353* | (2006.01) |
| *B06B 1/06* | (2006.01) |
| *G01H 9/00* | (2006.01) |

(52) U.S. Cl.
CPC .............. *G02B 6/00* (2013.01); *G01M 5/0033* (2013.01); *G01M 5/0066* (2013.01); *G01M 5/0091* (2013.01); *B06B 1/0651* (2013.01); *G01D 5/35383* (2013.01); *G01H 9/004* (2013.01); *Y02B 10/30* (2013.01)

(58) Field of Classification Search
None
See application file for complete search history.

(56) References Cited

U.S. PATENT DOCUMENTS

| 5,136,236 A * | 8/1992 | Bohnert et al. ................. 324/96 |
| 6,496,264 B1 * | 12/2002 | Goldner et al. .............. 356/478 |
| 6,659,957 B1 * | 12/2003 | Vardi et al. ..................... 600/467 |
| 8,234,924 B2 * | 8/2012 | Saxena et al. .................. 73/632 |
| 2007/0266788 A1 * | 11/2007 | Kim ............................... 73/588 |
| 2009/0157358 A1 * | 6/2009 | Kim ............................. 702/185 |

OTHER PUBLICATIONS

Coppla et al., "Analysis of Feasibility on the Use of Fiber Bragg Grating Sensors as Ultrasound Detectors", Pro. SPIE, Aug. 6, 2001, vol. 4328, pp. 224-232.
Luo et al., "Numerical Analysis and Optimization of Optical Spectral Characteristics of Fiber Bragg Gratings Modulated by a Transverse Acoustic Wave", Applied Optics, vol. 46, Issue 28, 2007, pp. 6959-6965.
Minardo et al., "Response of Fiber Bragg Gratings to Longitudinal Ultrasonic Waves", IEEE Transactions on Ultrasonics, Ferroelectrics and Frequency Control, Feb. 2005, vol. 52, Issue 2, pp. 304-312.

* cited by examiner

*Primary Examiner* — Uyen Chau N Le
*Assistant Examiner* — John M Bedtelyon
(74) *Attorney, Agent, or Firm* — Dority Manning, P.A.

(57) ABSTRACT

In one aspect, the present subject matter is directed to a sensor. The sensor includes an encapsulated fiber optic sensor and a ring shaped structure. The encapsulated fiber optic sensor passes through the ring shaped structure. The ring shaped structure is configured to resonate at a predetermined frequency.

14 Claims, 5 Drawing Sheets

~~FIG. 2~~

B: SS
TOTAL DEFORMATION 4
TYPE: TOTAL DEFORMATION
FREQUENCY: 3.0401e+005 Hz
UNIT: mm
6/7/2011 12:22 am

- 2011.2 MAX
- 1818.6
- 1625.9
- 1433.3
- 1240.6
- 1048
- 855.32
- 662.67
- 470.02
- 277.38 MIN

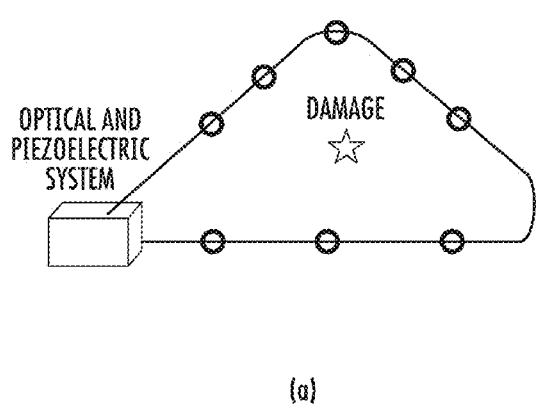
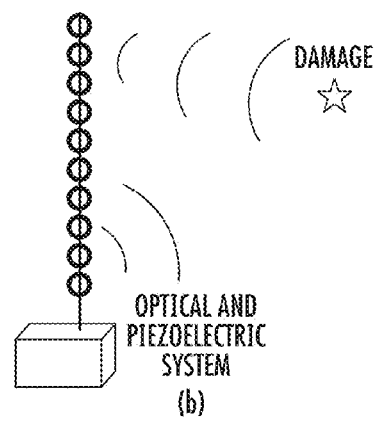
FIG. 7A  FIG. 7B
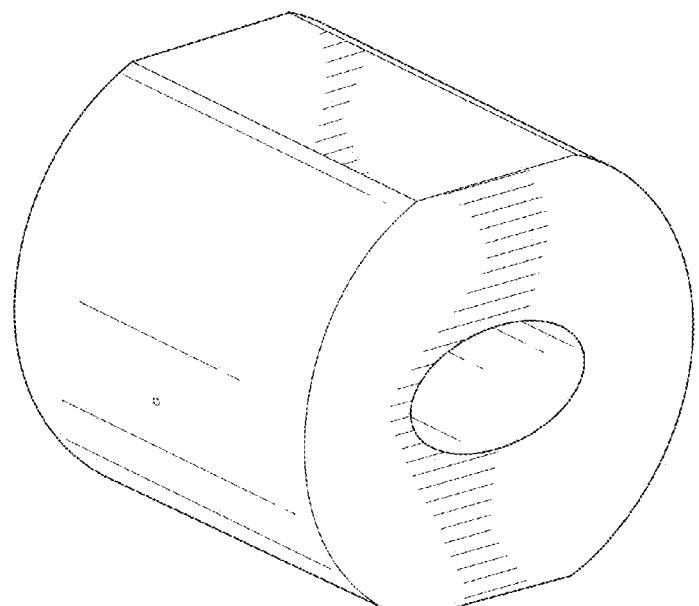
FIG. 8

ACOUSTO-ULTRASONIC SENSOR

GOVERNMENT SUPPORT CLAUSE

This invention was made with government support under N00014-11-1-0271 awarded by the Office of Naval Research. The government has certain rights in the invention.

BACKGROUND

Several major natural disasters, such as earthquakes, hurricanes or tsunami, have occurred in the last decades causing a large number of victims and a considerable monetary loss through the collapse of bridges, buildings, energy infrastructures, or transportation systems. Therefore, the needs to identify structural damage and to monitor its evolution impose the development of structural health monitoring (SHM) detection techniques. The main objective of the SHM research is to develop methods for observing in-situ structural behavior under different loading conditions during predetermined time periods or over the structure lifetime and to detect the deterioration of structural or material properties.

A wide range of sensors have been developed particularly for generating and receiving acousto-ultrasonic waves, exemplified by piezoelectric wafer active sensors (PWAS) and fiber Bragg grating (FBG) sensors. Both are effectively used in acousto-ultrasonic based damage identification because a single technology is not suited for the entire range of applications. FIG. 1 illustrates the set-up of the hybrid acousto-ultrasonic concept. Surface bonding or embedding are two ways of integrating the PWAS or FBG into a host structure. In the case of embedded, the mechanical behavior of the composite laminate are not degraded by the presence of the FBG or PWAS inclusion.

As such, it would be desirable to provide integrated miniaturize transducers that can be permanently bonded to the structure and left in place to be activated on demand and demonstrate that they can be used to monitor structural integrity in service conditions with high reliability & durability. It would also be desirable to develop a combined piezo-optical sensing system and to prove high reliability over the structure lifetime, since unjustified maintenance actions are quite costly to the operator.

SUMMARY

Aspects and advantages of the invention will be set forth in part in the following description, or may be obvious from the description, or may be learned through practice of the invention.

In one aspect, the present subject matter is directed to a sensor. The sensor includes an encapsulated fiber optic sensor and a ring shaped structure. The encapsulated fiber optic sensor passes through the ring shaped structure. The ring shaped structure is configured to resonate at a predetermined frequency.

In yet another aspect of the present disclosure, a method of utilizing a sensor is disclosed. The method includes transmitting signals from the encapsulated fiber optic sensor and the ring shaped structure, the encapsulated fiber optic sensor signal comprising optical channels and the ring shaped structure signal comprising electrical channels.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 depicts the disclosed acousto-ultrasonic piezoelectric—optical sensor (a) Sparse array; (b) phased array, in accordance with certain aspects of the present disclosure;

FIG. 8 depicts a sensor in accordance with the present disclosure;

DETAILED DESCRIPTION

Figure 1:
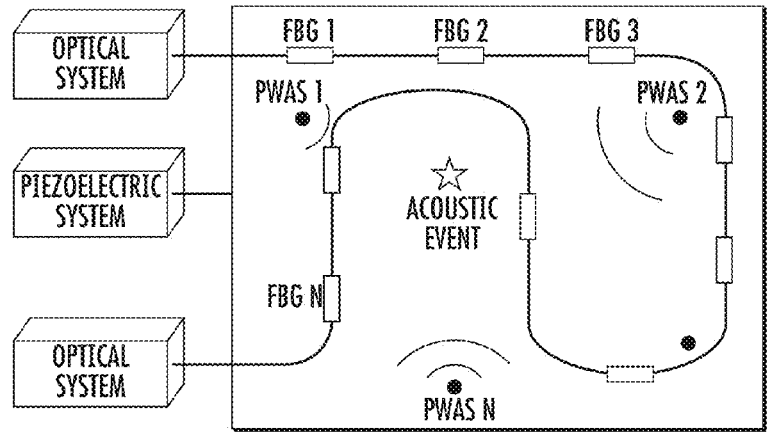
FIG. 1 depicts a general set-up of a hybrid acousto-ultrasonic concept.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to acousto-ultrasonic sensor and systems and methods pertaining to the same. The sensors of the present disclosure include an encapsulated fiber optic sensor and a ring shaped structure, which can include a piezoelectric sensor. As described herein, the actuator-sensor decoupling (i.e. minimum interference between the two sensors output signal) is greatly improved because different mechanisms are used for signal transmission. In this regard, the piezoelectric sensor (or actuator) uses electrical channels while the encapsulated fiber optic sensor uses optical channels.

In addition, a method of utilizing a sensor is disclosed. The method includes transmitting signals from the encapsulated fiber optic sensor and the ring shaped structure sensor such that the encapsulated fiber optic sensor signal comprises optical channels and the ring shaped structure sensor signal comprises electrical channels.

Piezoelectric Wafer Active Sensors

Figure 2A:
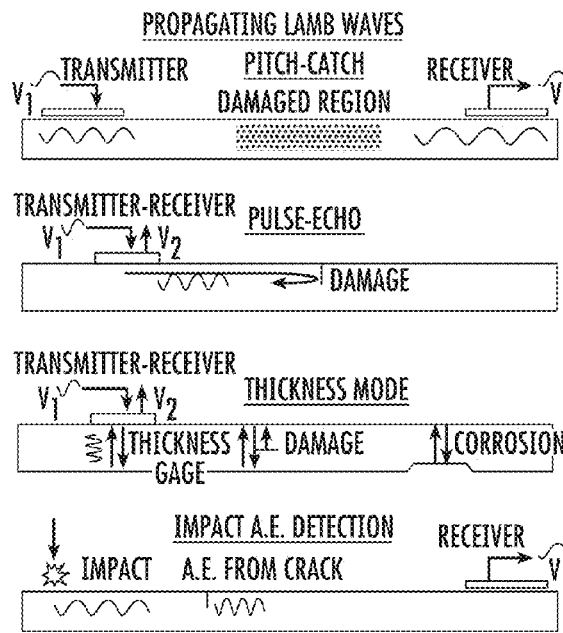
FIGS. 2A, 2B, and 2C depict the various ways in which piezoelectric wafer active sensors (PWAS) are used for structural sensing includes propagating Lamb waves, standing Lamb waves (electromechanical impedance) and phased arrays.
Figure 2B:
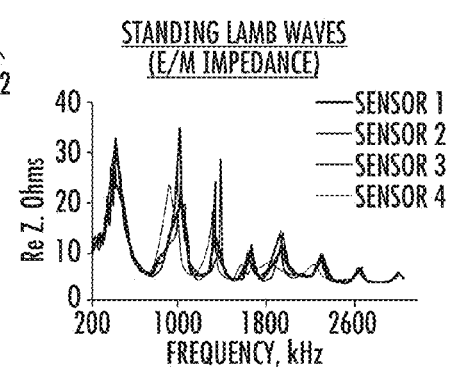
Figure 2C:
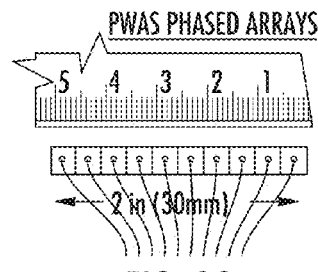

Lamb wave is one of the guided acoustic waves with its propagation vectors parallel to the structure surface. In addition, Lamb wave could also couple its energy throughout the structure thickness. These two characteristics make Lamb wave an ideal candidate for SHM applications. Piezoelectric wafer active sensors (PWAS) have emerged as one of the major structural health monitoring (SHM) technology; with the same installation of PWAS transducers, one they can apply a variety of damage detection methods; propagating acousto-ultrasonic waves, standing waves (electromechanical impedance) and phases arrays. FIG. 2 illustrates the various ways in which piezoelectric wafer active sensors (PWAS) are used for structural sensing includes propagating Lamb waves, standing Lamb waves (electromechanical impedance) and phased arrays. The propagating waves method include: pitch-catch; pulse-echo; thickness mode; and passive detection of impacts and acoustic emission (AE).

Miniaturized acousto-ultrasonic transducers, such as PWAS attached directly to structural elements, have gained large popularity due to their low cost, simplicity, and versatility. These transducers can actively interrogate a structure using a variety of guided-wave methods such as pitch-catch, pulse-echo, phased arrays, and electromechanical (E/M) impedance technique.

Fiber Bragg Grating (FBG) Sensors

The interaction between lamb waves and FBG sensors is simple: propagating lamb waves change the grating pitch of the sensor which then causes the Bragg wavelength to shift. By monitoring the Bragg wavelength shifts, lamb waves can be reconstructed. The structural information, such as the existence, the size, the location and the growth of cracks, can be obtained by analyzing the received lamb waves. Theoretical analysis for the response of FBG sensors to longitudinal and transverse waves are reported in Mnardo, A., et al., *Response of fiber Bragg gratings to longitudinal ultrasonic waves*. IEEE Transactions on Ultrasonics and Ferroelectrics, 2005. 52: p. 304-312, and Luo, Z. Q., et al., *Numerical analysis and optimization of optical spectral characteristics of fiber Bragg gratings modulated by a transverse acoustic wave*. Appl. Opt., 2007. 46: p. 6959-6965, respectively, both incorporated by reference herein. The ratio between the wavelength of the Lamb wave and the grating length of the FBG sensor needs to be considered. A numerical analysis on this ratio is detailed in Coppola, G., *Analysis of feasibility on the use of fiber Bragg grating sensors as ultrasound detectors*. Proc. SPIE, 2001. 4328: p. 224-232, incorporated by reference herein, with the conclusion that only if the ratio exceeds a certain value, the lamb waves could be characterized by FBG sensors. An ideal value of this ratio is set as of 6:1 to allow the response of FBG sensors to be effectively independent of the lamb wave wavelength.

FBG sensors have been used for ultrasonic/acoustic signal measurements in several different fields, but their applications for damage detections are relatively new. The conclusion of previous experimental work is that FBG sensors could be used to record the acoustic signals and the results show FBG sensors offer the same quality as the ones from the conventional PZT transducers.

Figure 3:
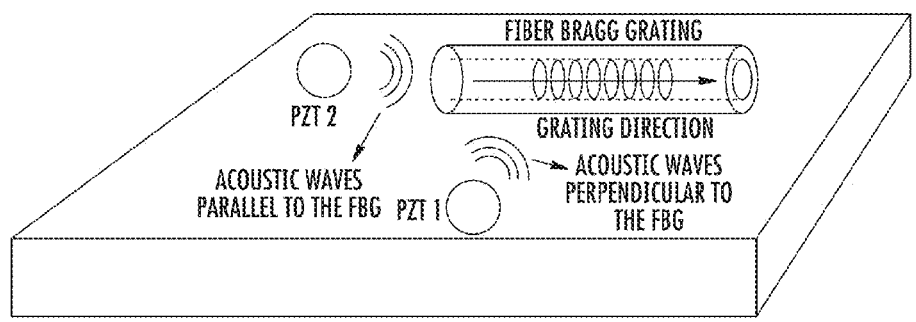
FIG. 3 depicts a configuration to characterize the directional property of an FBG sensor to acousto-ultrasonic wave.

Furthermore, the response of FBG sensors to acoustic waves is dependent on the relative positions of the signal source (acoustic event or piezoelectric transducers) and FBG sensors, meaning that FBG sensors have high directivity (unidirectional). In this case, the received signal amplitude is evaluated with respect to the directions of the incoming acoustic waves, which can be tested with the configuration shown in FIG. 3. Results show that the amplitude in the parallel case (ultrasonic wave come from PZT2) is 100-times stronger than the perpendicular case (Ultrasonic wave come from PZT1).

A more sensitive FBG acoustic sensor configuration has been previously proposed, where a one-end-free and strain-free FBG sensor is packaged into a steel tube and the tube is bonded to a structure. A similar idea is also applied an acoustic emission measurements.

The sensors can be either passive (e.g., strain, temperature, or the like) or active (e.g., ultrasonic transducers that can interrogate the structure to detect damage presence, extent, and intensity, or the like). Since active ultrasonic sensing can provide more flexibility than passive acoustic sensing, PWAS transducers are needed to provide inspection ultrasonics waves, where FBG or/and PWAS sensors are used as the receivers. In order to take full advantages of fiber optics, it is desirable that the inspection acoustic waves could be generated using fiber optic techniques. For this, an all-fiber optic acoustic monitoring method has been demonstrated utilizing an extrinsic Fabry Perot Interferometer. In this technique, a portion of the fiber cladding is replaced by graphite-epoxy composite. This material is able to absorb the pulsed laser light and convert the energy absorbed to the rapid increase of local temperature. This results in the rapid thermal expansion. With the thermal expansion of such cladding material, acoustic waves can be generated. In this design, both the acoustic wave source and receiver are based on fiber optics.

Figure 4:
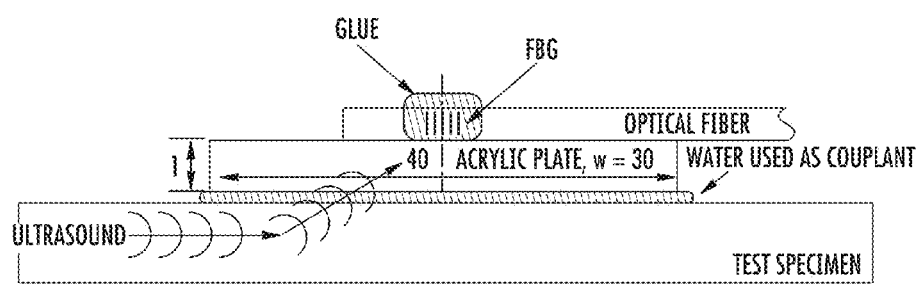
FIG. 4 depicts a schematic of a mobile FBG ultrasonic sensor.

A mobile FBG sensor has been previously developed as shown in FIG. 4. The sensor head includes a 40×30×1 mm$^3$ acrylic plate to which a FBG is glued with strain gauges adhesive. Water was used as a coupling agent between the test specimen and the acrylic plate. Ultrasound traveling in the test specimen enters the acrylic plate and impinges on the FBG attached to the acrylic plate. The mobile FBG sensor can detect ultrasound at any place by shifting the sensor head just like conventional piezoelectric probes.

FBG Encapsulation

A suitable protection for FBG is required, for practical and long term installation in infrastructures. Several encapsulation techniques have been proposed for specific applications. One of the schemes describes encapsulating one FBG in a capillary metal tube, with two holders at the extremities designed to be embedded in a structure. This configuration transfers the deformation from the structure to the FBG sensor, while protecting it.

Figure 5A:
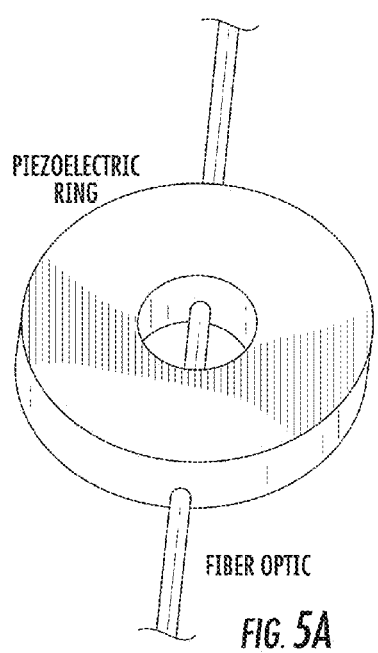
FIGS. 5A and 5B depict an acousto-ultrasonic piezoelectric-fiber optic sensor in accordance with certain aspects of the present disclosure.
Figure 5B:
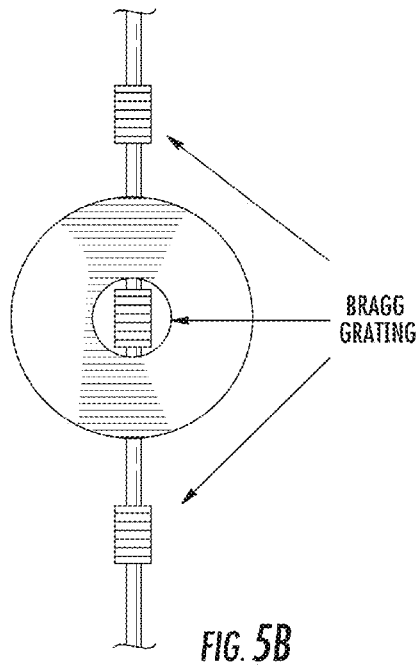

In accordance with the present disclosure, a new sensor combining an encapsulated fiber optic sensor (e.g. Bragg grating) with a piezoelectric small ring (e.g. annular PWAS) is disclosed. Referring to FIGS. 5A and 5B, the acousto-ultrasonic piezoelectric-fiber optic sensor of the present disclosure is illustrated. The system as described offers a novel and unprecedented solution for acousto-ultrasonic measurements that is beyond state of the art. Using this new concept, measurements and monitoring of ultrasonic waves, acoustic events as well as loads, pressure, temperature, or the like, are possible.

The mode shape for the disclosed ring sensor can be calculated following Blevins (1979) approximation equation $$f_i = \frac{i(i^2 - 1)}{\sqrt{2\pi R^2(i^2 + 1)}} \sqrt{\frac{EI}{m}}$$

Where i is the mode number; R is the radius of the midline of the ring; E is the modulus of elasticity; I is the moments of inertia; m is the mass per unit length of the ring and $f_i$ represents the natural frequencies.

For instance, using the piezoelectric properties, with the dimensions ID=2.9 mm; OD=8.7 mm; H=5.8 mm and Blevin's formula, a flexural frequency of 387.5 kHz.

Figure 6:
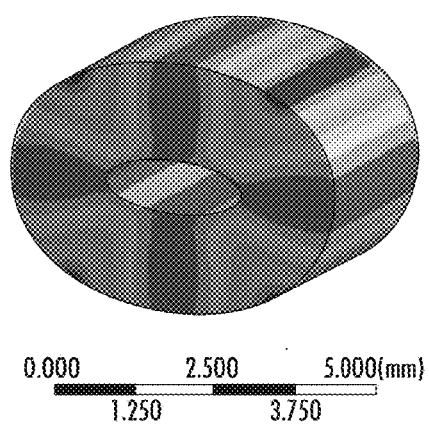
FIG. 6 depicts a piezoelectric ring with f=304 kHz in accordance with certain aspects of the present disclosure.

Commercial software such as ANSYS Workbench and more precisely the analysis system Modal can be utilized to develop a model sensor. The 3-D sensor can be modeled using the analytical method dimensions. Boundary conditions can be applied to calculate the natural frequencies as illustrated in FIG. 6. This figure shows a shape for the piezoelectric ring materials which is able to reach 300 kHz on FEM. However this system could be used for different center frequency by changing the dimensions of the piezoelectric ring sensor.

There are several benefits of piezo-optical system of the present disclosure. The actuator-sensor decoupling (i.e. minimum interference between the two sensors output signal) is greatly improved because they use different mechanisms for signal transmission: the piezoelectric sensor (or actuator) use electrical channels while the FBG sensor use optical channels. In addition, a large amount of P-FBGS can be multiplexed on single optical fiber. The present sensor can also be used for a multitude of measurements and the FBG has a unidirectional sensitivity, while the PWAS has a multidirectional sensitivity. The electrically excitation to PFBG (from the piezoelectric ring sensor) allows for direct unadulterated reading of the excitation strain to serve as excitation reference. Further, two strains can be captured simultaneously: (i) circumferential averaged strain (piezoelectric ring sensor); (ii) directional strain (FBG sensor). The use of the transducers (from the piezoelectric ring sensor) can actively interrogate the structure using a variety of guided-wave methods such as pitch-catch, pulse-echo, sparse array (illustrated in FIG. 7A), phased arrays (illustrated in FIG. 7B), and electromechanical (E/M) impedance technique.

The present disclosure can be utilized in connection with several applications, including but not limited to, civil Engineering (bridges, building, transportation system, or the like), energy infrastructure (wind turbine, nuclear system, solar cells, oil and gas industry, offshore, or the like), national security (surveillance for anti-submarine warfare passive sonar, anti-terrorism/force protection system, or the like), environmental and pollution control (sensing gases such as methane, ammonia, sulfur dioxide, nitrogen oxides and for monitoring seawater and drinking water, or the like), biomedical applications (in-vivo sensors for pH, O2 and CO2 levels in blood, glucose and cholesterol control, or the like), chemical industry, or other suitable applications.

The present disclosure can be better understood with reference to the following examples.

EXAMPLES

Figure 9A:
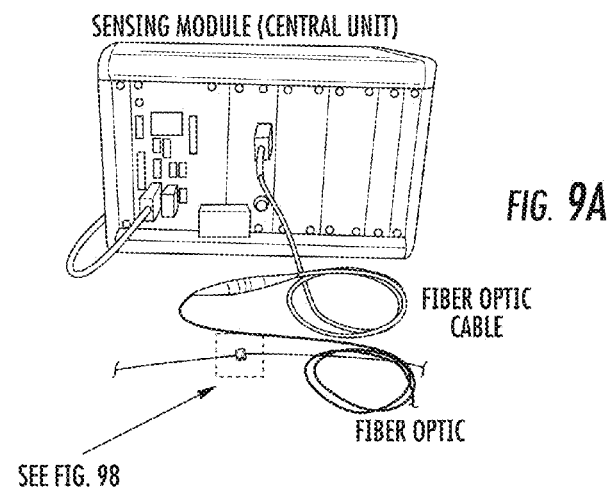
FIGS. 9A, 9B and 9C depicts an experimental setup in accordance with certain aspects of the present disclosure.
Figures 9B, 9C:
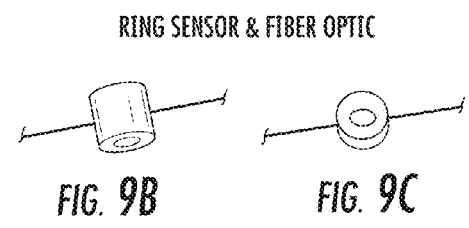
Figure 10:
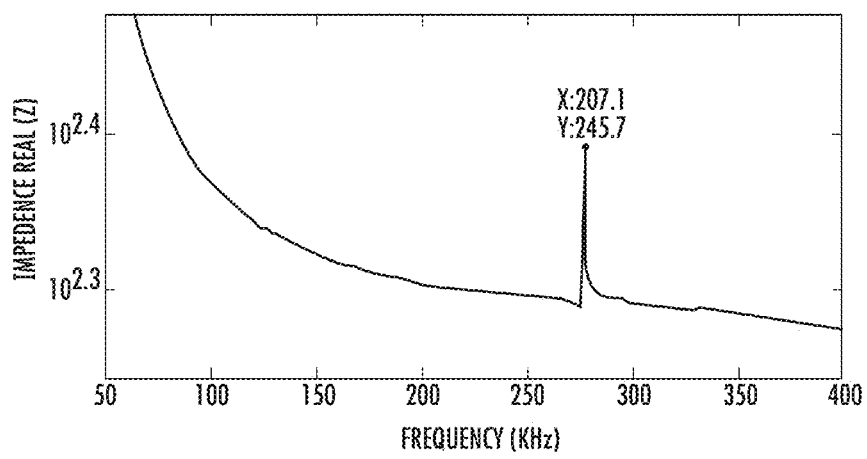
FIG. 10 depicts a graph of impedance and frequency in accordance with certain aspects of the present disclosure.

A 300 kHz, 4.35 mm diameter, 304 stainless steel sensor with an internal ellipse shape was machined. FIG. 8 illustrates the shape of the sensor. A piezo wafer active sensor (PWAS) was attached to the top of the sensor. The PWAS excites the natural vibration modes of the structure. Frequency response function (FRF) is measured through electromechanical (E/M) coupling using the impedance analyzer as real part of the complex impedance ReZ. Resonances appear as peaks in the ReZ spectrum. A sensing module was joined to a fiber optic cable, which was joined to a fiber optic, which was joined to a ring sensor, as shown in FIG. 9. Results can be found in FIG. 10.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A sensor comprising:
   a fiber optic sensor comprising an optical fiber; and
   a ring shaped structure, the ring shaped structure comprising a material surrounding an opening, the opening defining a longitudinal axis, the optical fiber passing through the material of the ring shaped structure in a direction that is at an angle to the longitudinal axis of the ring shaped structure such that the material encapsulates the optical fiber along a portion of the length of the optical fiber, the ring shaped structure being configured to resonate at a predetermined frequency.

2. The sensor of claim 1, wherein the fiber optic sensor comprises a Fiber Bragg grating sensor.

3. The sensor of claim 1, wherein the ring shaped structure comprises a piezoelectric sensor.

4. The sensor of claim 3, wherein the piezoelectric sensor comprises a piezoelectric wafer active sensor.

5. A sensor array comprising a plurality of sensors joined to one another by a fiber optic connection, each sensor comprising an optical fiber and a ring shaped structure, each ring shaped structure comprising a material surrounding an opening, the opening defining a longitudinal axis, the optical fiber passing through the material of the ring shaped structure in a direction that is at an angle to the longitudinal axis of the ring shaped structure such that the material encapsulates the optical fiber along a portion of the length of the optical fiber, the ring shaped structure being configured to resonate at a predetermined frequency.

6. The sensor array of claim 5, wherein at least one of the sensors comprises a Fiber Bragg grating sensor.

7. The sensor array of claim 5, wherein at least one ring shaped structure comprises a piezoelectric sensor.

8. The sensor array of claim 7, wherein at least one piezoelectric sensor comprises a piezoelectric wafer active sensor.

9. The sensor array of claim 5, wherein the sensors are joined in a phased array.

10. The sensor array of claim 5, wherein the sensors are joined in a sparse array.

11. A method of utilizing the sensor of claim 1, the method comprising:
    transmitting signals from the fiber optic sensor and the ring shaped structure, the fiber optic sensor signal comprising optical channels and the ring shaped structure signal comprising electrical channels.

12. The method of claim 11, wherein the ring shaped structure comprises a piezoelectric sensor that comprises one or more transducers.

13. The method of claim 12, wherein the transducers are utilized to interrogate a structure.

14. The method of claim 11, wherein the method further comprises joining a plurality of the sensors together and transmitting signals from each of the sensors, wherein the optical fiber of each sensor transmits a sensor signal via optical channels and the ring shaped structure of each sensor comprises a piezoelectric sensor that transmits a sensor signal via electrical channels.

* * * * *